US005308586A

United States Patent [19]

Fritsche et al.

[11] Patent Number: 5,308,586

[45] Date of Patent: May 3, 1994

[54] ELECTROSTATIC SEPARATOR USING A BEAD BED

[75] Inventors: G. Ray Fritsche, Oceanside; Roko S. V. Bujas, Leucadia, both of Calif.; Giovanni C. Caprioglio, Praha, Czechoslovakia

[73] Assignee: General Atomics, San Diego, Calif.

[21] Appl. No.: 877,330

[22] Filed: May 1, 1992

[51] Int. Cl.[5] .......................... B01J 8/18; F27B 15/12

[52] U.S. Cl. .................................... 422/147; 204/186; 204/188; 204/302; 422/139; 422/211; 422/261; 522/411

[58] Field of Search ............... 502/407, 410, 411, 415; 204/302, 186, 188; 422/171, 177, 211, 261, 147, 139

[56] References Cited

U.S. PATENT DOCUMENTS 3,839,226 10/1974 Yates .................................. 502/407
3,928,158 12/1975 Fritsche et al. ..................... 204/188
4,194,956 3/1980 Seguine .............................. 204/186

OTHER PUBLICATIONS

"The Gulftronic Separator: The Solution for Catalyst Fines Removal" Sales Brochure.

*Primary Examiner*—James C. Housel
*Assistant Examiner*—Amalia Santiago
*Attorney, Agent, or Firm*—Fitch, Even, Tabin & Flannery

[57] ABSTRACT

Beads for use in beds in electrostatic separators for the separation of suspended particles from hydrocarbon oils. Electrostatic separators employing a bed of these beads have the capacity to remove as much as 99 weight percent of contaminating particles, such as catalyst fines, from various oil fractions to levels of less than 100 parts per million and even less than 5 ppm. A method and apparatus for purifying various FCC oils using these beads is also provided.

13 Claims, 1 Drawing Sheet

ELECTROSTATIC SEPARATOR USING A BEAD BED

FIELD OF INVENTION

This invention relates to an improved method and apparatus for removing particulate contaminants from hydrocarbon oils or the like. The invention is particularly suited for removing catalytic cracking contaminants from various fractions of oil in petroleum processing using an electrostatic separator wherein a bed of glass beads is maintained across an electrostatic field.

BACKGROUND OF THE INVENTION

The requirements for cleaner fuel oil are an increasingly important challenge for petroleum processing. Crude oil fractions are processed by being "cracked" in a refinery by passing such fractions through a catalytic cracker, followed by fractionation in a distillation column. Fluid Catalytic Crackers (FCC) units include a fluidized bed reactor and a regenerator. The reactors are vessels containing a finely divided catalyst. Incoming petroleum feed stocks are generally vaporized by contact with heated catalyst and pass as a stream of mainly gas through the reactor at a sufficient velocity to maintain the catalyst particles in the form of a fluidized bed. The cracked feed stock passes from the catalyst bed through cyclone separators or dust collectors, which retrieve the bulk of the catalyst particles through the use of a centrifugal flow pattern, and then into a fractionating column or system. A fraction of the spent catalyst is discharged into the regenerator where accumulated carbon is burned from the particles at high temperatures. Generally the type of cracker employed depends on the type of feed stock, such as a gas oil cracker for fractionating light oils, and a residual oil cracker for fractionating heavy oils and tar.

A commonly used fluidized bed catalytic cracker is one which employs a zeolite catalyst in the form of alumina-silicate base particles. In this and other systems, small particles of catalyst or "fines" become entrained in the fluid stream passing through the cracker and are not separated by the cyclones, and as a result enter the fractionating system. Most of the entrained catalyst fines are retained in the heaviest fraction leaving the main column of the fractionator. This fraction is referred to as main column bottoms (MCB) or as fluidized catalytic cracker bottoms (FCCB), or as bottoms slurry oil.

Several alternative apparatuses have been considered for removing catalyst contaminants from the bottoms slurry oil by workers in the petroleum industry. Hydrocyclones were considered, but since these work best at lower viscosities they necessarily must operate at higher temperatures than is considered practical or safe. Hydrocyclones also have a removal efficiency of only about 70%. Conventional filters were also considered, but it was found in trial runs that such filters became plugged and it was not practical to clean them by backflushing. An apparatus which has been found to successfully clean slurry oil is a separator which operates by passing the oil to be cleaned through a bed of glass beads maintained in an electrostatic field. This separator is referred to herein as an electrostatic bead bed separator, and acts to capture contaminating particles as the oil passes through the void spaces surrounding the bead surfaces. Such separators are easily backflushed with compatible oils or solvents as the beads become saturated with contaminants. These electrostatic bead bed separators have proved to be efficient in removing catalyst particles from oils and can be efficiently backflushed for cleaning.

This electrostatic bead bed separator is described in U.S. Pat. No. 3,928,158 to Fritsche et al. The principles of bead bed purification as described in this patent have been adapted to large-scale commercial use in petroleum refining, in a commercial unit called the Gulftronic TM separator, sold by General Atomics in San Diego, Calif.

The Gulftronic TM separator employs glass beads of high resistivity, such as soda-lime glass, having a resistivity of $6.2 \times 10^{8}$ l ohm-cm at 125° C. The electrostatic bead beds employing these beads are effective in removing particulate contaminants, in particular pieces of catalyst, with as high as 95% efficiency. However, new requirements for cleaner oils having less than 100 parts per million (ppm) (by weight), and in some cases having 5 ppm or even less of contaminants, prompted a search for materials which could provide even more efficient separation to purify oils up to 99% or even essentially 100% free from catalyst particles and other contaminants.

Furthermore, it has been found that during operation of an electrostatic separator or filter, such as the Gulftronic TM separator, sodium ion depletion of the bead surface is observed over time. This results in weakening and cracking of the beads, and also results in changes in the electrical conductivity of the beads which require adjustments in operating conditions.

Therefore, it has become desirable to find beads which would provide an improved performance when placed under an electrical field for separation of oils from contaminants.

SUMMARY OF THE INVENTION

Improved beads including potassium oxides have now been provided for use in electrostatic bead bed separators for separation of contaminants from hydrocarbon oils. Electrostatic bead bed separators employing these beads are particularly suited for the separation of catalyst fines from the various oil fractions, and most particularly from the bottoms slurry oil exiting from fluidized bed catalytic crackers. Methods of separating particulate contaminants employing these improved beads are also provided.

DETAILED DESCRIPTION OF PREFERRED EMBODIMENTS

Figure 1:
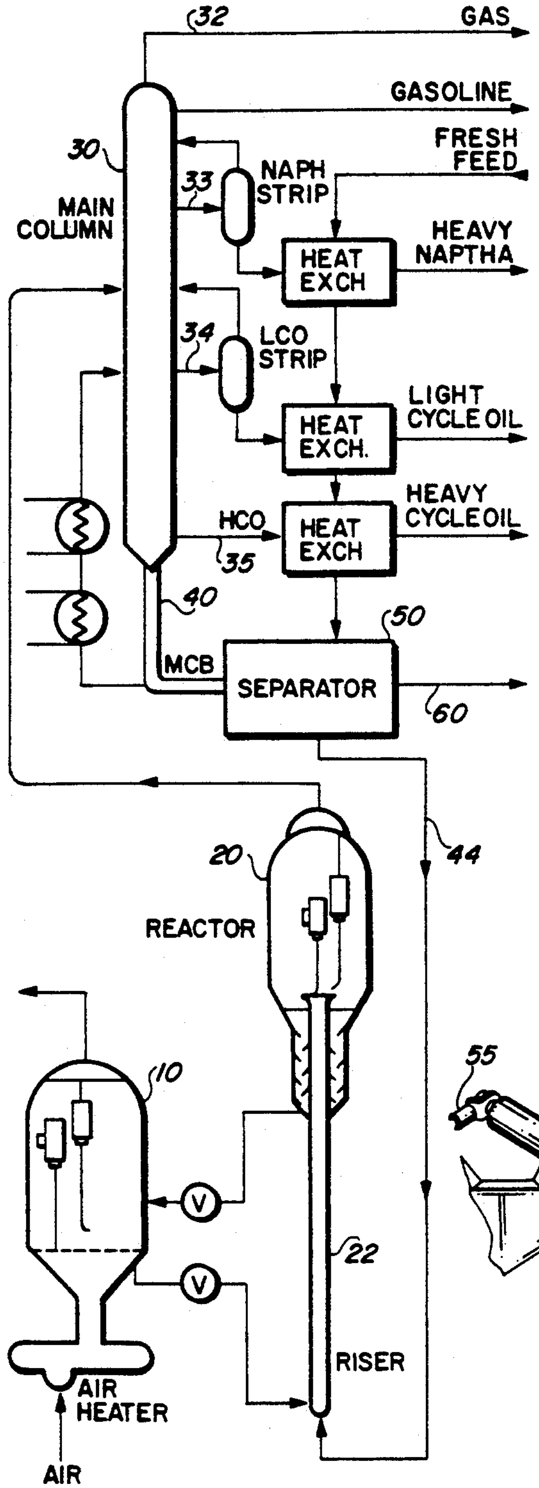
FIG. 1 shows the employment of an electronic separator in a schematic drawing of a Fluidized bed Catalytic Cracker (FCC) system of a petroleum refinery.

Unless defined otherwise, all technical and scientific terms used herein have the same meaning as is commonly understood by one of skill in the art to which this invention belongs.

As used herein, electrostatic bead bed separator refers to a volume of beads packed into a hollow container such as a cylinder. A potential gradient is provided across the bead bed by a pair of electrodes. Typical electrode arrangements include a rod located in the center of the container, with the shell of the container acting as a second electrode, or a cylindrical electrode located coaxial with a center rod within the housing of the container, with the rod and housing serving as ground electrodes. Electrostatic bead bed separators are the subject of U.S Pat. No. 3,928,158 to Fritsche et al., which is hereby incorporated by reference.

As used herein, the term bead refers to a substantially smooth particle ranging in size from approximately 1/32 inch in diameter to approximately ¼ inch in diameter. By substantially smooth is meant beads in which the actual surface area is not substantially greater than the theoretical surface area calculated for a spherical bead, or alternatively, wherein the depth of surface indentations is less than one-half their diameter.

As used herein, the term "high resistivity", whether referring to oils or beads, is considered to be a resistivity of greater than about $1\times10^6$ ohm-cm. This is a resistivity greater than the lowest resistivity of crude or processed petroleum fractions.

As used herein, the reference to oils "free from significant amounts of dispersed water" is considered to mean oils containing amounts of water which do not interfere with an electrostatic field maintained across a bed of beads when such oils are passed through the interstitial spaces of the electrostatic bead bed. This amount is readily determined by one of skill in the art.

As used herein, the term glass beads refers to particles of the above size range made according to methods known in the art for making glass spheroids. Glass beads may be made from any number of compositions of oxides, as is known in the art, but glass is generally understood to require at least about 50% silicon oxides.

As used herein the term sodium (Na) beads refers to glass beads having at least 10% sodium oxides and substantially no other alkali metal oxides in their composition. Sodium beads such as soda-lime glass beads are well known and commercially available.

As used herein the term potassium (K) bead refers to glass beads having about 5 to 40% potassium oxide in their compositions. Potassium beads as used herein may contain some amounts of oxides of lithium, cesium, rubidium and even sodium in their chemical composition.

The beads of the present invention generally incorporate the physical characteristics of the beads described in U.S. Pat. No. 3,928,158 to Fritsche et al.

The patent to Fritsche et al. describes what are termed "electrostatic filters" or beds of high resistivity beads across which an electrostatic charge is maintained with a pair of electrodes. Oil to be purified is pumped through the interstitial spaces between the beads under an electric current for filtering. In the described electrostatic bead bed separator, AC voltage or DC voltage may be applied across the bed. The patent to Fritsche et al. describes how the build-up of contaminants over the surface of the beads over time leads to an increase in amperage across the bed, which is an indication that backflushing of the beads with a compatible oil or solvent, such as kerosene, to remove contaminants is required. The patent describes the use of "high resistivity" beads made of ceramic or other material, meaning that the beads employed must have a higher resistivity than the oils being filtered, or the bead bed will short out quickly. Typical resistivities of oils to be filtered vary from that of a reduced crude, having a resistivity of approximately $1\times10^8$ ohm-cm at 275° F., to a bottoms product after hydrocracking of $1\times10^{13}$ at the same temperature. It is theorized that beads having lower resistivity than the oil being filtered become polarized in the bead bed with a resultant accumulation of a film of solids over the surface of the beads, thus shorting out the current flow. The desired effect of beads having higher resistivity than the oils being filtered is for the contaminants to accumulate at the points of contact between adjacent beads, rather than along the surface of the beads.

The beads described in this patent have the characteristics of being substantially spherical, substantially smooth and substantially non-deformable. Substantially spherical is defined as having a roundness and sphericity of at least 0.9 as defined by the Krumbein and Sloss sphericity scale. It was found that non-spherical glass chips can remove particles as well as glass beads, but that some sphericity is needed so that beads may be quickly and uniformly backflushed to clean them of particles. Substantially smooth is defined as materials where actual surface area of a bead is not substantially greater than the theoretical surface area calculated for a substantially spherical shape, or alternatively, where the depth of the indentations on the surface of the beads is less than one-half their diameter. Substantially non-deformable is defined as meaning that there is no detectable distortion in configuration of the beads when these beads are placed under electrical loads normally encountered in cleaning of oils.

The present invention provides improved beads for use in filtering particles from oil and for use in a bead bed separating unit in particular. The improved beads of this invention incorporate all of the advantageous qualities of the beads as described above from U.S. Pat. No. 3,928,158 to Fritsche et al. The improved beads of this invention are also of the same approximate size of the beads described in the patent to Fritsche et al., that is, varying from a minimum of approximately 1/32 inch in diameter to a maximum of approximately ¼ inch in diameter. Beads as small as approximately 1/32 of an inch are advantageously used when the oil to be filtered has a low viscosity, and rate of flow is low. The most preferred size of the beads of this invention is an average size of approximately ⅛ inch diameter. This size is particularly advantageous in the filtration of liquids ranging in properties from those of light gas oils to those of reduced crudes.

It is not necessary to use beads of uniform size in the bead beds of the present invention. Beads having a Tyler screen size of 4–20 mesh (about 5 mm. to about 0.8 mm.) may be employed; however, preferably beads of 4–16 mesh (5 mm. to 1 mm.), and most preferably beads of 5–7 mesh (4 mm. to 3.5 mm.) are used for bead bed separators.

It has not been previously recognized that the chemical composition of beads in a bead bed conferred qualities on the beads that influence the ability of a bead bed in an electrostatic field to remove contaminating particles.

Two observations may be useful in explaining the effect of chemical composition of beads on the ability of a bead bed to remove charged particles from oil. The first observation is that when an electrostatic field is applied across a bead bed, the current flowing through the beads themselves rather than the current flowing through the oil influences the removal of particles. The second observation is that ionic conductivity within the beads rather than electronic conductivity within the beads results in efficient particle removal from oil. This is demonstrated by experimental trials using beads having electronic rather than ionic conductivity, resulting in poor removal of particles from various oils.

It has now been found that beads containing approximately 5 to 40 percent potassium oxides as part of their composition have an enhanced ability to remove particulate contaminants from oils when compared to beads containing sodium oxides only. Preferably the beads have from about 15 to 35 weight percent potassium oxides, more preferably about 20 to 35 percent and most preferably about 20 to 30 percent. These potassium oxide-containing beads may also possibly include some sodium oxides in addition to the potassium oxides, e.g. up to and including approximately 50% of the percentage of potassium oxides. The potassium-containing beads may possibly contain other oxides, in the form of one or a mixture of cesium oxides, lithium oxides, and rubidium oxides in addition to or as a replacement for some or all of the potassium oxides. These potassium beads also usually contain small amounts of calcium and magnesium oxides and other typical components of silica glasses. The inclusion of potassium oxides is thought to provide an altered bead ionic conductivity resulting in enhanced particle removal.

The patent to Fritsche et al. teaches that ceramic beads including glass beads are useful in the electrostatic bead bed separators described. Sodium-containing glass beads are readily available and have been used in commercially successful separators. Soda-lime glass beads, containing sodium oxides, have been used for a number of years in the Gulftronic TM separator. One exemplary composition for soda-lime glass is the following: 68.5% $SiO_2$, 1.5% $Al_2O_3$, 17.28% $Na_2O$, 6.1% CaO, 4.22% MgO, 1.76% $TiO_2$, 0.011% BaO, which glass composition has been used commercially for a number of years.

It has unexpectedly now been found that the glass beads containing potassium oxides function more effectively than sodium beads in removing particles from oils. Beads containing potassium oxides were able to remove as much as essentially 100% of all contaminating particles from oils in experimental tests. Potassium oxide-containing beads are particularly effective at removing fine catalyst particles or fines from a variety of oils such as FCC bottoms oil. Potassium beads consistently remove catalyst fines from oil samples in test runs to below 100 ppm, and in many cases remove fines to levels at or below 5 ppm. The potassium beads surprisingly maintain a more constant high electrical resistivity than the sodium beads.

The potassium beads used are glass beads which more preferably contain from about 20% to about 35% potassium oxide in their chemical compositions. As mentioned hereinbefore, these potassium beads might also possibly include sodium oxides, cesium oxides, rubidium oxides and/or lithium oxides. The most basic composition for such potassium beads is a glass having at least about 50% silicon oxides and at least about 5% potassium oxides. Such potassium beads also optionally may include aluminum oxides, calcium oxides, magnesium oxides, titanium oxides, and additional oxides of other elements in amounts within ranges commonly used in such glasses. Preferred compositions of potassium glass beads according to this invention are represented by weight percentages of each component in the ranges as follows:

| | |
|---|---|
| $SiO_2$ | 50%-90% |
| $Al_2O_3$ | 0%-25% |
| $K_2O$ | 5%-40% |
| CaO | 0%-15% |
| MgO | 0%-12% |
| $TiO_2$ | 0%-5% |

Such glass compositions may also contain up to 10% of additional oxides of the types which are commonly present in minor amounts in glass, as would be known to those of skill in the art of making glass.

A particularly preferred composition of potassium glass beads according to this invention, represented by weight percentage of each component, is the following approximate composition: 62% $SiO_2$, 2% $Al_2O_3$, 25% $K_2O$, 6% CaO, 4% MgO, and 1% $TiO_2$.

Potassium beads are made according to methods known in the art for making glass beads. A final density for the potassium glass beads of this invention is in the range of approximately 2.45 to 2.55 grams/cm$^3$, and preferably the beads have a density of approximately 2.48 to 2.52 grams/cm$^3$. The resistivity of the potassium glass beads of this invention is in the range of $1\times10^4$ ohm-cm to $9\times10^{12}$ ohm-cm. The preferred resistivity of the beads will vary according to the type of oil being filtered. Bottoms oil generally requires lower resistivity beads to effectively remove contaminating particles than do lighter weight oils.

In another aspect of this invention, electrostatic bead bed separators containing the improved beads are provided. Basically electrostatic bead bed separators include a hollow container such as a cylindrical shell, into which the preferred beads are disposed as a bead bed, and a set of electrodes spanning the bead bed. The beads generally occupy about 60% of the volume of the bead bed while interstitial spaces between the beads constitute about 40% of the volume of the bead bed, regardless of the diameter of the beads. The electrodes confer an average potential gradient across the bead bed, which can be varied from approximately 5 KV per inch to a maximum of approximately 20 Kv per inch. The optimum voltage applied depends upon the dielectric constant or high specific resistance of the oil treated. As is understood by one of skill in the art, a higher potential gradient is required for separating oils having a higher dielectric constant. DC voltage is found to be the most effective for removing particles from oils, with AC voltage being somewhat less effective.

The electrostatic field across the bead bed is typically monitored by a voltmeter and ammeter. Initially the voltage applied is such that the amperage across a bed of improved potassium beads is generally similar to the amperage across a bed of sodium beads.

Over time, as contaminating particles accumulate across a bead bed, the bed should be backflushed with an adequate volume of solvent or compatible oil to remove the accumulated particles. Backflushing may be either set by time, or triggered by an increase in amperage across the bead bed. Solvents such as kerosene are effective for backflushing. However, compatible oils, preferably feed stocks, are preferred for backflushing. The backflushed catalyst material is then preferably returned to the intake of the catalytic cracker.

Electrostatic bead bed separators employing the improved beads of this invention are suitable for removing contaminating particles of a wide range of sizes. These improved bead bed separators will easily remove particles of greater than 50 microns to less than 0.001 micron in diameter.

A preferred embodiment of a type of bead bed separator for employing the improved beads of this invention is the design of the Gulftronic TM separator, which has successfully been used to remove catalyst fines and other contaminants from various fractions of cracked oil. This electrostatic separator is particularly suited to capture catalyst particles from both gas oil crackers, which process light oils, and residual oil crackers, which process heavier feed stocks.

FIG. 1 shows an exemplary placement of a separator, indicated by reference numeral 50, using the improved potassium beads, in a schematic drawing of a portion of a petroleum refinery. FIG. 1 generally shows the flow of cracked petroleum feed from an FCC reactor 20 to a main fractionating column 30 which splits the cracked petroleum material into the various fractions indicated by the streams 32, 33, 34, 35 and 40. A regenerator, indicated by reference numeral 10, regenerates the spent catalyst and returns it to the reactor via a riser indicated by numeral 22. The heaviest fraction, the main column bottoms, flows as the stream 40 into the separator 50. The purified stream leaves the separator as low ash slurry oil as indicated by numeral 60. When backflushing periodically occurs, the stream 60 from a particular separator (a dozen or more separators may often be used in parallel combination) ceases, and the backflushed fines along with fresh feed stock are returned to the reactor 20 via the riser 22 through the line 44. The separator 50 may also be used so as to electrostatically filter other fractions, such as the HCO stream 35 leaving the main column 30. The arrangement as shown in FIG. 1 produces low-ash feedstock for premium marine and other fuel, and for making carbon black, needle coke, carbon fibers and the like by capturing catalyst fines that cannot be filtered out by conventional filters. The set-up shown in FIG. 1 utilizes fresh FCC feed for a backflush stream and is preferred; however, other solvents or oil can be used.

Figure 2:
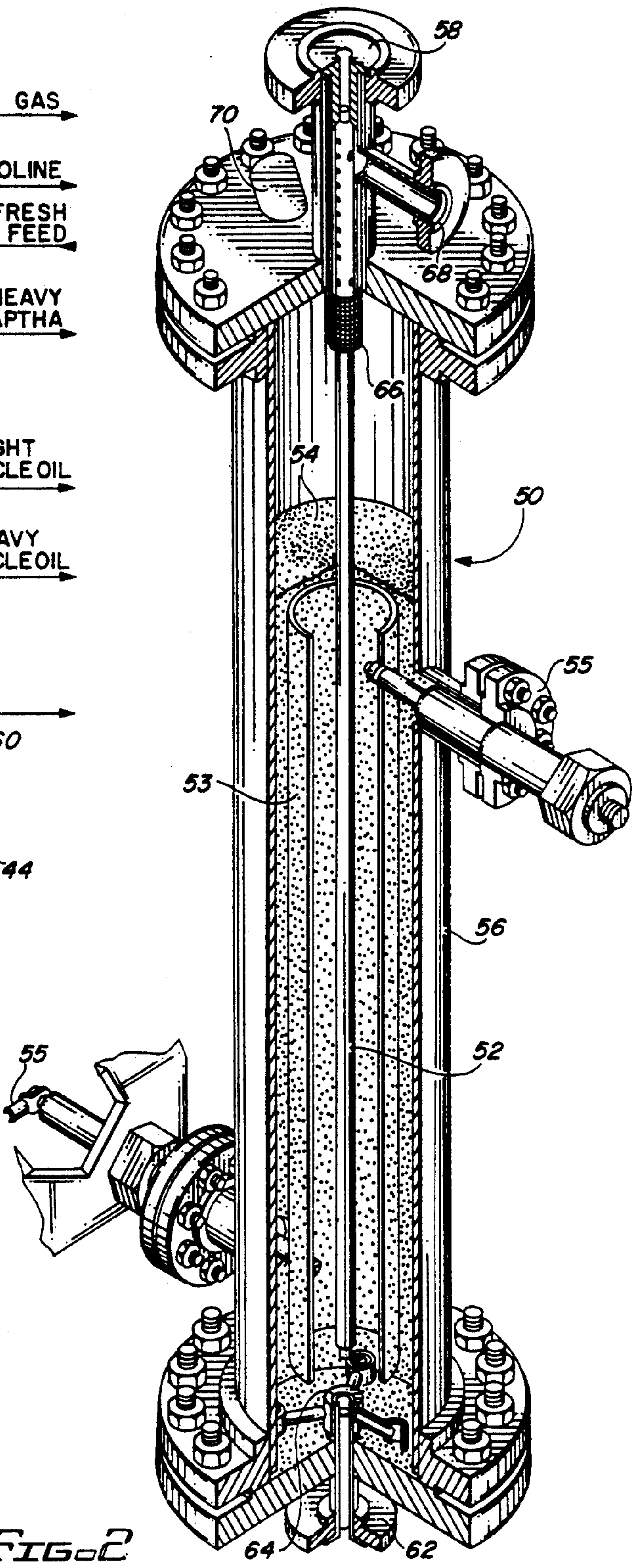
FIG. 2 is a cross-sectional view of the electrostatic separator of FIG. 1.

FIG. 2 shows a cross-sectional diagram of the separator unit 50. The unit 50 contains 2 electrodes, a center ground electrode 52, and a tubular hot shell electrode 53. The unit 50 is filled with a bed 54 of the improved beads to 2 or 3 inches above the top of the hot shell electrode 53. A screen (not shown) is placed at the bottom of the unit 50 just above a backflush distributor 64 to prevent the beads from entering the distributor 64 and leaving with the exit stream. A fairly high DC voltage, typically about 30 KV, is applied via the lower one of a pair of high voltage bushings 55 which support the hot shell electrode 53 within the unit cavity by connection to the negative terminal of a power supply, creating an electrical field in the bed of the glass beads 54, extending inwardly to the center electrode 52 and outwardly to the containment vessel 55 which is also grounded by connection to the positive power supply terminal.

Slurry oil containing catalyst fines flows in from the bottom of the main column 30 through an inlet port 58. Typically the temperature of the incoming oil is between about 150° and about 200° C. The catalyst particles become trapped at the points of contact between adjacent beads 54. Initially the electric current is low, in the range of 50 to 100 milliamps (mA), but it increases gradually as the amount of catalyst particles trapped in the glass beads 54 begins to spread over the surfaces of the beads. Backflushing is begun before the current reaches about 150 mA by halting the inflow of MCB through the inlet 58 and injecting a surge of backflush media through the normal exit port 62 at the bottom of the unit 50 which flows upward through the backflush distributor 64 which spreads the flow and fluidizes the beads. At the time of backflushing, valves such as ball valves (not shown) are operated to insulate the unit from its normal connection to the line 40 entering the inlet 58 and to the line 60 carrying the product from the outlet 62, and the electrical connection from the power supply to the high voltage bushing 55 is preferably interrupted so that the electrostatic field is removed to aid in the scrubbing of the catalyst particles from the fluidized beads. The backflush media flows upward throughout the unit 50 fluidizing the glass beads 54 and spreading them throughout the length of the cavity. The backflush liquid exits by passing through a screen 66 and leaves the unit 50 via a side outlet 68. The backflush media is preferably catalytic cracker feed which has been heated by heat-exchanges with the streams from the fractionator 30, typically a volume of approximately 40 gallons of feed stock is pumped upward through the separator during a period of approximately three minutes. The backflush is then fed to the catalytic cracker as shown in FIG. 1 to return the catalyst particles thereto via the riser 22. The switch from downward separation flow to backflushing and vice versa is preferably controlled by a suitable programmable logic controller. The time between backflushing will vary with the type of oil being filtered and the amount of contamination it carries. Typically the units 50 are flushed approximately every three hours. The separator is also preferably equipped with a glass beads fill port 70 at its top.

These units 50 may be of any size, but typically are approximately 12 inches in diameter by 6 feet tall. A unit of this size will hold approximately 1 million beads which occupy about the lower 4.5 feet of the cavity. The flow rate of oil through the separator will vary with the type of oil being filtered. Typically the flow rate from residual oil crackers is approximately 250 barrels per 24 hours through each unit, giving a residence time in the bed of glass beads of about 131 seconds. The flow rate from gas oil crackers will be approximately 300 barrels per day, giving a residence time of about 109 seconds.

The separators 50 and other separators containing the improved potassium beads are capable of removing catalyst fines from oils to levels of less than 100 parts per million and in some cases less than about 5 parts per million. This capability is illustrated in the following examples.

EXAMPLE I

1. Description of Test Unit

The test unit employed for testing of the effectiveness of various beads for use in an electrostatic bead bed separator is a cylindrical steel shell 4 inches in diameter and 12 inches tall, containing a steel rod ¼ inch in diameter extending upwardly from the bottom of the apparatus located along the axis of the shell. The rod acts as the negative electrode, and the shell, which is grounded, acts as the second electrode. The test beads are packed in the annular space between the rod and shell to a height of approximately 4.5 inches. Approximately 60% of the bed volume is occupied by the beads, while 40% is void volume.

DC voltage is found to be the most effective in establishing a current across the bed of beads, from the rod to the shell, and it is preferred. AC voltage is found to be less effective in removing particles from oil in this test unit. The electric field across the bead bed is automatically monitored by a voltmeter and ammeter. Backflushing, if utilized, is set by time or in response to increased amperage across the bed.

The test apparatus includes a 1.5 gallon reservoir of oil mounted over the cylindrical shell. Oil flows by gravity through the test cylinder for cleaning. The residence time of the oil in the bead bed varies somewhat depending on the type of oil.

Sample oils for cleaning are obtained from working refineries. A good source of test oils is bottoms oil (MCB) containing alumina-silicate catalyst particles which are typically coated with carbon. The estimated particle size range of the contaminating particles is 50 to 0.001 microns in diameter for these oils.

2. Experimental Set-Up

The following test was conducted in the above-described apparatus using Oil Samples A, B, and C. Sample A is from a residual oil FCC unit in Texas having an API gravity of −2 to −4. Sample B is from a residual oil FCC unit in Texas but petroleum pitch was introduced into the feed stock. Sample C is from a gas oil FCC unit in California having typical properties used for carbon black feed stock. Identical volumes of each oil sample are passed through a bead bed about 4.5 inches in height containing the two different types of glass beads.

The samples are initially tested for particulate content by filtering a 50 gram portion of each sample through a #AAWP0470 Millipore filter paper under suction. The amount of contaminating particulates found by filtering is measured in milligrams per 50 grams of oil, which is then converted to parts per million (ppm).

A test is run for each oil sample through a bead bed of each bead type to be compared. The particle content of the effluent oil sample is again determined by filtering a 50 gram sample of effluent through a #AAWP040M Millipore filter.

In this test, two types of beads were compared for ability to purify sample oils. The first type of bead tested is the standard soda-lime beads of approximately ⅛ inch average diameter, spherical shape, and an estimated resistivity of approximately $6.2\times10^{8}$ ohm-cm at 125° C. These beads have the following approximate composition: 68.5% $SiO_2$, 1.5% $Al_2O_3$, 17.28% $Na_2O$, 6.1% CaO, 4.22% MgO, 1.76% $TiO_2$, 0.011% BaO, and are hereinafter referred to as standard Na beads.

The second type of beads tested for their ability to purify the sample oils are potassium beads having the same approximate diameter, shape and resistivity. The potassium beads have the following approximate composition: 62% $SiO_2$, 2% $Al_2O_3$, 25% $K_2O$, 6% CaO, 4% MgO and 1% $TiO_2$.

Approximately 1.5 gallons of each sample of oil were allowed to flow through the test unit under identical conditions for each type of beads. The oil samples flowed at a rate so as to have a residence time of approximately 140 seconds, under a voltage of 30 KV DC (negative polarity) at approximately 250° to 275° F. The current in milliamps measured across each bead bed type is given in Table I. The final parts per million (ppm) of contaminating particles remaining in the effluent oil samples after each run is given for each type of bead tested. The results are given in Table I.

3. Results

TABLE I

| Oil Sample | Bead Type | Initial ppm | mA Measured | Final ppm |
|---|---|---|---|---|
| A | Na | 3222 | 9.2 | 77 |
| | K | 3222 | 4.4 | 25 |
| B | Na | 2728 | 2.9 | 446 |
| | K | 2728 | 3.3 | 84 |
| C | Na | 2161 | 2.42 | 191 |
| | K | 2161 | 1.5 | 3 |

As can be seen from Table I, the K beads are more effective than the Na beads in removing particulates from all of the oil samples filtered. In all of the samples, the final particulate concentration is reduced by the K beads to well below 100 ppm. Only in the case of sample A do the sodium beads reduce the final particulate concentration below 100 ppm. In the case of sample C, the K beads are particularly strikingly more effective in removing particulates than the Na beads. The final particulate level in this case when treated by the K beads is more than 50 times below that of the Na beads. Therefore, it is clear, (1) that the K beads are more effective in removing catalyst particulates from the sample oils than the Na beads in all cases; and (2) that K beads consistently reduce the particulate levels to well below 100 ppm for all samples tested and even below 5 ppm for sample C.

EXAMPLE II

The following experiment was conducted at an operating petroleum refinery. This experiment compared the effectiveness of electrostatic bead bed separator modules containing standard soda-lime beads with the effectiveness of electrostatic bead bed separator modules containing improved potassium beads in removing contaminating particles from oil.

Six operating modules each including a pair of Gulftronic TM separators of the type shown in FIG. 2 and described hereinbefore, which are arranged in parallel and contain the standard soda-lime beads, were compared with a seventh module wherein the pair of separators are filled with the improved potassium beads described in Example I. The total flow rate of oil through the installation including the seven modules was about 148 barrels per hour (B/H), and the inlet temperature for all seven was about 335° F. The voltage applied to modules 1 through 6 was 30 KV; a slightly lower voltage of 25 KV was applied to module 7. The solid particulate level in the incoming feed was 4153 ppm. The throughput of 148 B/H is higher than the suggested flow rate for optimum performance. The effluent from each of the modules was measured, and the following results were obtained:

TABLE II

| SAMPLE | FINAL PPM |
|---|---|
| Mod 1 | 493 |
| Mod 2 | 627 |
| Mod 3 | 457 |
| Mod 4 | 1067 |
| Mod 5 | 1013 |
| Mod 6 | 697 |
| Mod 7 | 130 |

It was noted that the current increase across module 7 was greater than the average current increase across modules 1–6. For example, during a 30-minute interval following backflushing, the average current across modules 1–6 rose from approximately 30 mA to approximately 60 mA. In contrast, the current across module 7 rose from approximately 30 mA to approximately 100 mA, which is indicative that more particulate catalyst is being removed by the improved potassium beads. Backflushing was carried out at a flow rate of about 70 B/H through each individual separator, and the two individual separators in a module are sequentially backflushed at about this rate for about 3 minutes each.

As is seen in Table II, module 7 containing the potassium beads was strikingly more effective in removing solid contaminants as compared with modules 1–6 containing the standard soda-lime beads. Module 7 reduced catalyst solids to a level of 130 ppm, compared with reduction to levels of about 457–1067 ppm for modules 1–6. The flow rate of the feed oil through the modules used in this experiment is higher than recommended for optimum particulate removal, i.e. about 250 to 280 barrels per day per separator. When the overall flow rate is lowered to less than about 140 barrels per hour in an installation such as this employing 14 separators and a main column bottom oil feed having this approximate contamination, reduction of catalyst particulates to a level of less than about 100 ppm is achieved in modules containing the improved potassium beads.

The electrostatic separators of this invention containing beads of the improved chemical composition are capable of separating catalyst fines and other contaminating particles from various oils to a final purity of less than 100 ppm and in many cases even to a final purity of less than 5 ppm. Even heavily contaminated bottoms slurry oil can be purified to this extent, thus providing ultra-clean feedstreams for carbon fiber production, premium marine fuels, and other uses. In separators such as these it can be a significant advantage to be able to employ a bed of beads which have a substantially constant high electrical resistivity, particularly in petroleum refineries where processing operations are designed to operate continuously for days or weeks at a time, and the improved potassium beads unexpectedly exhibit such a characteristic and also permit the use of lower voltages than the standard sodium beads which should give rise to longer lifetime. The use in electrostatic separators of beds of beads that do not substantially change in electrical resistivity eliminates the further need for adjusting the incoming petroleum temperature upward to offset decreases in electrical resistivity and further allows separator operation at a lower temperature and thus should further extend lifetime for this reason.

Although the invention has been described with reference to the presently-preferred embodiments, it should be understood that various changes and modifications can be made without departing from the spirit of the invention, which is defined only by the claims appended hereto.

What is claimed is:

1. An electrostatic bead bed separator for separating suspended particles from oils having a resistivity of greater than about $1\times10^6$ ohm-cm comprising a hollow shell containing a plurality of glass beads arranged as a bed of glass beads, and a pair of electrodes for applying a potential gradient across said bead bed, said glass beads comprise at least about 50% silicon oxides, and at least about 5% potassium oxides.

2. The separator of claim 1 wherein said beads comprise 50%–90% $SiO_2$,0%–25% $Al_2O_3$,5%–40% $K_2O$, 0%–15% CaO, 0%–12% MgO, and 0%–5% $TiO_2$.

3. The separator of claim 2 wherein said beads have an approximate chemical composition of 62% $SiO_2$, 2% $Al_2O_3$, 25% $K_2O$, 6% CaO, 4% MgO, and 1% $TiO_2$.

4. The separator of claim 2 wherein the chemical composition of said beads also includes one or more oxides of sodium, cesium, rubidium, or lithium.

5. The separator of claim 1 wherein said beads are spheroids having an average diameter of between about 1/32 inch and about ¼ inch.

6. A method of separating suspended solid particles from oils having a resistivity of greater than about $1\times10^6$ ohm-cm from a fractionation column located downstream of a fluidized bed catalytic cracker, which method comprises passing said oils through the interstitial spaces of a bed of glass beads maintained in an electrostatic field, said glass beads having a size of from about 1/32 inch to about ¼ inch and having a chemical composition comprising at least 50% silicon oxides, and at least 5% potassium oxides, and periodically backflushing said solid particles from said bed of beads.

7. The method of claim 6 wherein said particles are separated from said oils to a final concentration of less than 100 ppm.

8. The method of claim 6 wherein said particles are separated from said oils to a final concentration of less than 5 ppm.

9. A system for providing main column bottoms oils, which system comprises:

a fluid catalytic cracker for receiving petroleum feed stock, including a fluidized bed reactor for providing a cracked petroleum feed stock and a regenerator, attached to at least one cyclone separator for separating catalyst particles from the cracked petroleum feed stock;

a main column fractionator for receiving said cracked feed stock from said cyclone separator and splitting said cracked feed stock into various oil fractions including main column bottoms oil;

an electrostatic separator containing a bed of glass beads, in the form of a plurality of glass beads not greater than about ¼ inch in size made of glass comprising at least about 50% silicon oxides and at least about 5% potassium oxides, for receiving said main column bottoms from said fractionator and for separating catalyst fines and other particles therefrom, and a backflushing system for periodically reversing flow of liquid through said electrostatic separator to flush said separated catalyst fines from said bed by pumping a predetermined amount of fresh petroleum feed stock therethrough in the opposite direction, and returning said flushed fines to said fluidized bed reactor together with said fresh feed stock.

10. The system of claim 9 wherein said beads comprise 50%–90% $SiO_2$, 0%–25% $Al_2O_3$, 5%–40% $K_2O$, 0%–15% CaO, 0%–12% MgO, and 0%–5% $TiO_2$.

11. The system of claim 10 wherein said plurality of glass beads have the following chemical composition: about 62% $SiO_2$, about 2% $Al_2O_3$, about 25% $K_2O$, about 6% CaO, about 4% MgO, and about 1% $TiO_2$.

12. The system of claim 10 wherein said chemical composition of said beads also includes one or more oxides of sodium, cesium, rubidium, or lithium in a total amount by weight less than said amount of potassium oxides.

13. The system of claim 9 wherein said plurality of beads have an average diameter of between 1/32 inch to ¼ inch inclusive.

* * * * *